Nov. 19, 1957     W. J. MORRISSEY     2,813,967

MULTIPLE POINT WELDING ELECTRODE

Filed Oct. 5, 1953

INVENTOR.
WILLIAM J. MORRISSEY
BY

ATTORNEY

United States Patent Office 2,813,967
Patented Nov. 19, 1957

2,813,967

MULTIPLE POINT WELDING ELECTRODE

William J. Morrissey, Hatfield Township, Pa., assignor to International Resistance Company, Philadelphia, Pa.

Application October 5, 1953, Serial No. 384,010

4 Claims. (Cl. 219—119)

This invention relates to a welding electrode assembly for resistance welders and, more specifically, to a welding electrode assembly which will weld at a multiple of aligned spaced points at the same time.

Heretofore to resistance weld at two or more aligned spaced points at the same time it was necessary to use a separate pair of mating electrodes for each point. Even where all the electrodes are mounted on one holder the assembly is large and complicated since, to obtain a good weld at each joint, it is necessary that the pressure applied by the electrodes to the separate joints to be welded is substantially the same thus requiring resilient mounting of the electrodes. If the pressure on any one joint is less than that on the other joints during the welding the electrical resistance at this joint will be higher than that at the other joints, and current will not flow therethrough so that the joint of higher resistance will not be welded.

It is therefore an object of this invention to provide a compact and simple welding electrode assembly comprising a single pair of electrodes which will form efficient welds at all of a multiple of aligned spaced points at the same time. Another object is to provide a welding electrode assembly for so welding at a multiple of aligned spaced points at the same time which can be used in any standard welding machine without modifying the machine. A further object is to provide for so welding simultaneously at a multiple of aligned spaced points a welding electrode assembly in which one of the electrodes is pivotally mounted so as to obtain substantially equal pressures at all weld points. Still another object is to provide a welding electrode assembly which does not stick to nor pick up particles of the parts being welded, thereby providing cleaner welds and lower maintenance of the welding assembly. Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawing in which.

Figure 1:
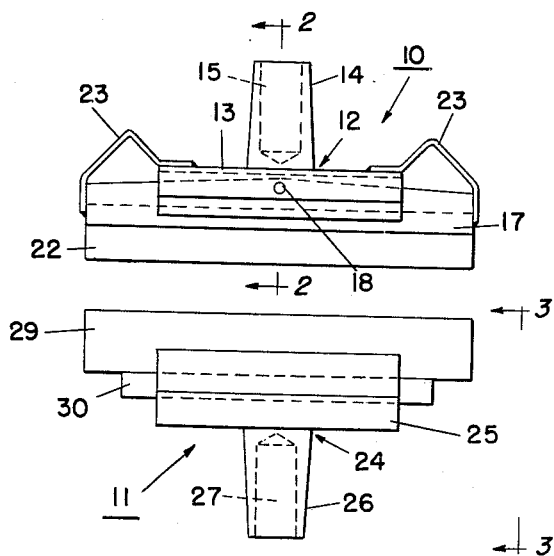
Figure 1 is a front elevational view of the welding electrode assembly.
Figure 2:
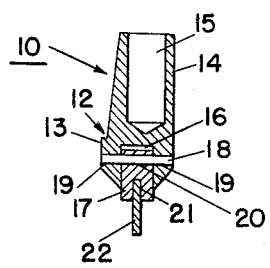
Figure 2 is a cross sectional view of the upper electrode taken along line 2—2 of Figure 1.
Figure 3:
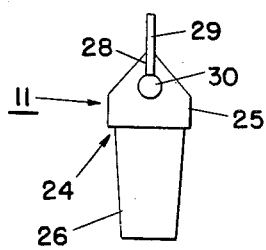
Figure 3 is an end elevational view of the bottom electrode taken along line 3—3 of Figure 1.

Referring to the drawing, in which similar parts throughout the several views bear like numerals, it will be seen that an embodiment of the welding electrode assembly may comprise an upper movable electrode 10 and a lower relatively fixed electrode 11. The upper electrode 10 comprises a holder 12 having an elongated, laterally-extending base 13 and a stem 14 extending upwardly from the top of the base 13. The holder is made of an electrically-conducting metal, such as bronze or brass. The stem 14 has a passage 15 extending down from its top end to receive a coolant. The base 13 has a longitudinally-extending groove 16 in its bottom surface preferably extending the full length of the base. An elongated, laterally-extending shoe 17 of an electrically conductive metal, such as bronze or brass, fits in the groove 16 and preferably extends laterally beyond each end of the base 13. A pin 18 extends transversely through holes 19 and 20 in the base and shoe respectively (see Figure 2) to connect pivotally the shoe to the base at the point between or medially of the ends of the base and shoe. The top of the shoe 17 preferably is tapered from a point above the pin hole 20 downwardly toward each end of the shoe so that the shoe can pivot or rock in the groove 16 although the shoe 17 may have a flat top surface which is spaced from the bottom of the groove to provide this function. The shoe 17 has a groove 21 in its bottom surface extending the full length thereof. An electrode tip 22, preferably as long as the shoe 17 and blade-shaped, fits in the groove 21 and is secured therein by any well known means, such as an electrically conducting solder or brazing compound. The electrode tip 22 may be made of any well known electrode material, such as the copper base alloys, but preferably is made of molybdenum for reasons which will be explained later. A pair of flexible straps 23 and 23 are attached to the ends of the base 13 of the holder 12 and extend to the respective end surfaces of the shoe 17 and are attached thereto to provide loops of sufficient excess lengths as to avoid interference with free pivoting of the shoe relative to the base. If desired the shoe 17 and electrode tip 22 may be made of a single piece of molybdenum instead of two separate parts secured together.

Although the lower electrode 11 may be a duplicate of the upper electrode 10, preferably it comprises a holder 24 of an electrically-conducting metal, such as brass or bronze, similar to the holder 12 of the upper electrode 10. The holder 24 comprises a base 25 and a stem 26 extending downwardly from the bottom of the base 25. The stem 26 has a passage 27 extending up from its bottom end to receive a coolant. The base 25 has a key hole shaped groove 28 in its top surface which extends the full length of the base. An electrode tip 29, similar to the electrode tip 22 in the upper electrode, fits in the slot section of the key hole shaped groove 28, and a steel rod 30, preferably circular in transverse cross-section, fits in the enlarged section of the groove 28 to reinforce the electrode tip 29. The electrode tip 29 and rod 30 are secured in the groove 28 by any well known means, such as an electrically-conducting solder or brazing.

This electrode assembly can be used in any well known resistance welding machine without modifying the machine and will weld intervening stock at any point along the opposed free edges of the electrode tip, or at any multiple of spaced points along these tip edges, at the same time as, for example, in welding a multiple of metal strips to a single metal strip at spaced points along the single strip. The only limitation to the number of separate weld joints that can be made at one time is dictated by this spacing and the length of the electrode tips, and of course this electrode assembly may be used for line welding. This electrode assembly permits the multipoint welding due to the fact that the electrode tip of the movable electrode is pivoted to its holder so that, incase of slight differences in the thicknesses of the parts being welded, this electrode tip can rock and make firm contact at each joint; and also to the fact that the flexible looped straps connected between the electrode holder and the ends of the shoe distribute the electric current along the entire length of the electrode tip substantially uniformly so that each joint to be welded is supplied with a similar amount of current, and without interfering with the tip rocking.

It has been discovered that by using electrode tips made of molybdenum cleaner welds are obtained and there is less maintenance of the electrode tips than with electrode tips made of the normally used copper base alloys. The molybdenum electrode tips do not stick to the parts being welded nor do they pick up particles of the parts being welded. Therefore it is not necessary to clean the electrode tips as much as is done with copper base alloy tips. It is felt that this is due to the fact that the molybdenum has an oxide surface coating which does not wet at the temperatures obtained during the welding operation.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An electrode for a resistance welding apparatus comprising the combination of a holder, a longitudinally-extending groove in the bottom of said holder, a shoe of electrically-conducting material in the groove, a pin extending transversely through the holder and shoe pivotally to connect the shoe to the holder, an elongated electrode tip attached to the bottom of the shoe, and electrically-conducting flexible straps extending from each end of the shoe to the holder and attached thereto.

2. An electrode for a resistance welding apparatus as set forth in claim 1 in which the top of the shoe is tapered from a point above the pin downwardly to each end of the shoe to facilitate pivoting of the shoe in the groove.

3. An electrode for a resistance welding apparatus comprising, in combination; a holder having a laterally-extending, elongated base portion and a stem portion extending from the top of the base portion, said base portion being provided with a groove in its bottom surface extending from end to end thereof; an elongated shoe slidably received in the groove and having its ends extended beyond the ends of the base portion; a pin extending transversely through the base portion and the shoe at a point between the ends thereof pivotally to connect the shoe to the base portion for rocking movement; an elongated electrode tip attached to the bottom of the shoe; and a pair of looped, electrically-conducting, flexible straps connecting opposite ends of said shoe to opposite ends of said base portion.

4. An electrode for a resistance welding apparatus as set forth in claim 3 in which the top of the shoe is tapered from a point above the pin downwardly to each end of the shoe to facilitate pivoting of the shoe in the groove.

References Cited in the file of this patent

UNITED STATES PATENTS

| | | |
|---|---|---|
| 1,176,614 | Stanley | Mar. 21, 1916 |
| 1,918,226 | Gilbert | July 11, 1933 |
| 2,179,693 | Goldstein | Nov. 14, 1939 |
| 2,479,547 | Wersler | Aug. 16, 1949 |
| 2,540,180 | Wirt | Feb. 6, 1951 |

FOREIGN PATENTS

| | | |
|---|---|---|
| 695,030 | Germany | Aug. 14, 1940 |